United States Patent [19]

Laakaniemi et al.

[11] Patent Number: 4,458,841
[45] Date of Patent: Jul. 10, 1984

[54] FUNCTION CONTROL MODULE FOR AIR TREATING SYSTEMS

[75] Inventors: Richard N. Laakaniemi, Hales Corners; Paul E. Wichman, Brookfield, both of Wis.

[73] Assignee: Johnson Controls, Inc., Milwaukee, Wis.

[21] Appl. No.: 441,286

[22] Filed: Nov. 12, 1982

Related U.S. Application Data

[63] Continuation of Ser. No. 227,492, Jan. 22, 1981, abandoned.

[51] Int. Cl.³ .............................................. F24F 7/00
[52] U.S. Cl. ...................................... 236/49; 137/269; 137/884
[58] Field of Search ....................... 137/884, 269, 271; 236/49; 339/186 M

[56] References Cited

U.S. PATENT DOCUMENTS

| | | | |
|---|---|---|---|
| 3,384,115 | 5/1968 | Orazan et al. | 137/884 |
| 3,465,772 | 9/1969 | Monge et al. | 137/884 X |
| 3,586,061 | 6/1971 | Cauritzen | 137/884 X |
| 3,814,126 | 6/1974 | Klee | 137/884 |
| 3,974,856 | 8/1976 | Lancier | 137/271 X |
| 4,352,532 | 10/1982 | Hardin | 137/884 X |

*Primary Examiner*—William E. Tapolcai
*Attorney, Agent, or Firm*—Andrus, Sceales, Starke & Sawall

[57] ABSTRACT

A modular fluid control module having a plug-in connector is provided for control of one or more functional load devices in response to fluid condition and demand input signals. The module includes a fluid circuit board having top and bottom plate members bonded to a common center plate. The top and bottom plates each have a plurality of parallel flow lines. The first and second parallel lines are substantially perpendicularly related to define an X-Y coordinate grid. The center plate has openings establishing preselected connection of the parallel flow lines in the top and bottom plates. The top plate includes a multiple input/output port connector which includes a plurality of ports connected to the parallel flow lines of the top plate. Each of the top and bottom plates includes a plurality of plug-in logic and control ports connected to select internal flow lines of the corresponding plate. A plurality of logic devices and interrelated control devices, such as fluid transmitters, fluid repeaters, fluid comparators, fluid signal receiving devices, fluid diodes and other similar devices, are coupled to the control ports for establishing selected response to the input signals and establishing output signals for the load devices to said port connector. The control ports not connected to a control device or other port is sealed by a cap or vented to atmosphere.

11 Claims, 19 Drawing Figures

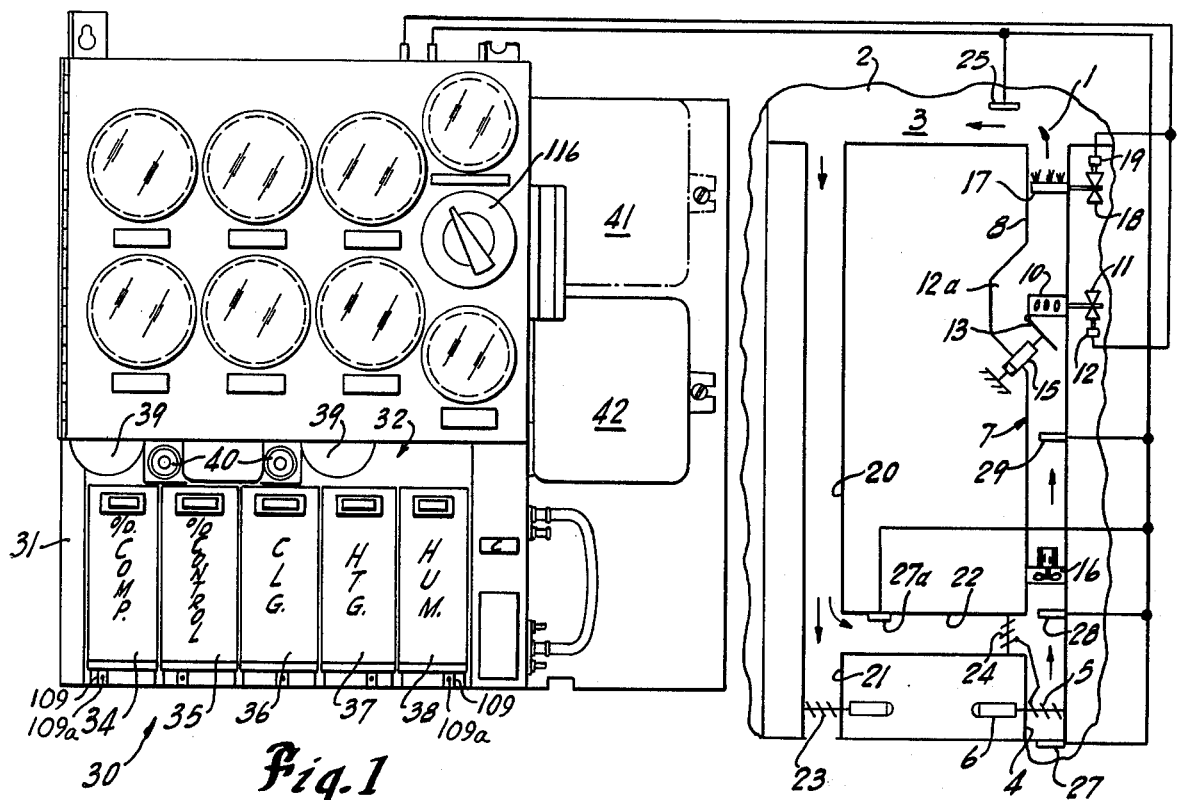
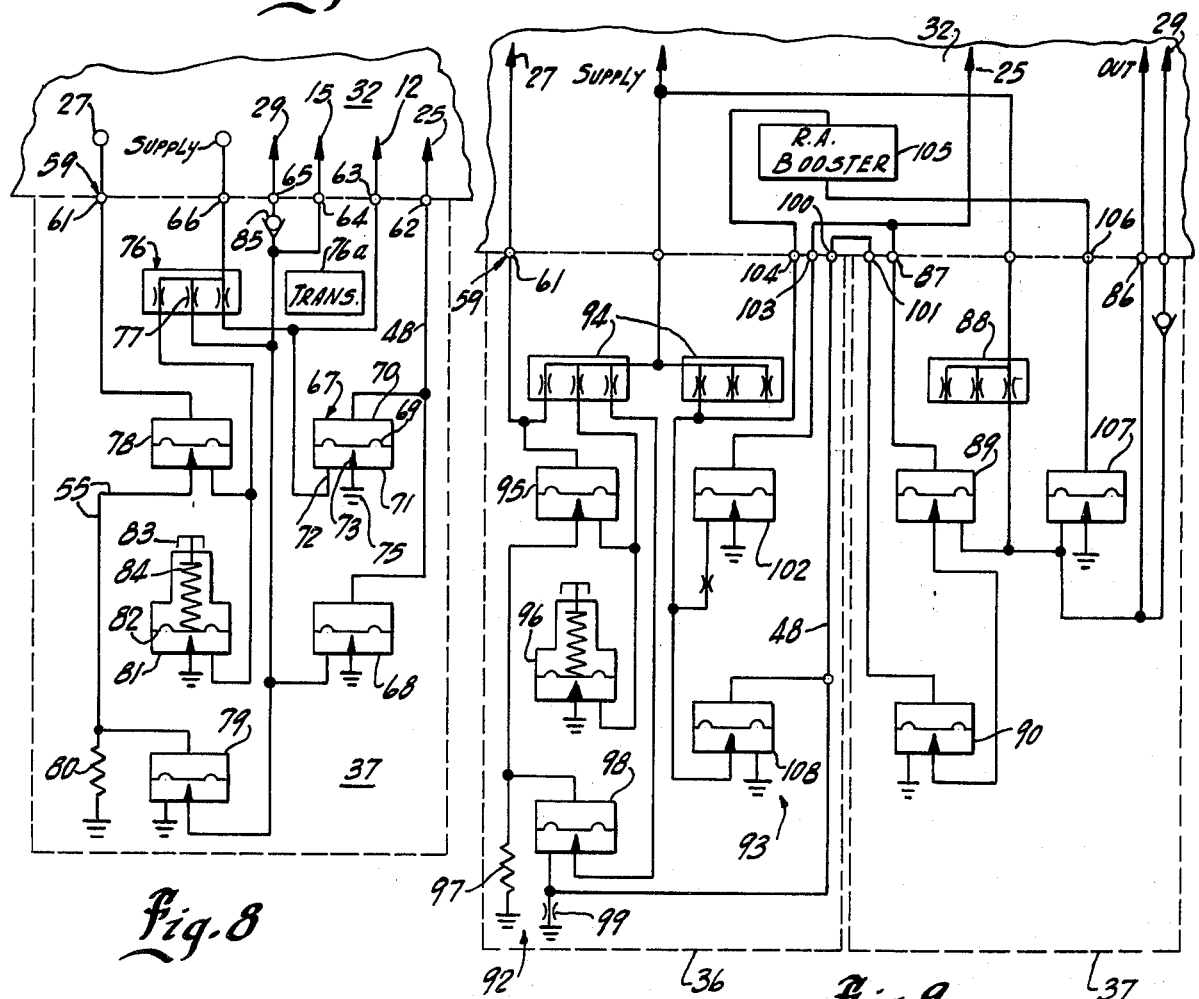

FUNCTION CONTROL MODULE FOR AIR TREATING SYSTEMS

This is a continuation application of application Ser. No. 227,492, filed Jan. 22, 1981.

BACKGROUND OF THE INVENTION

This invention relates to an improved functional control with integrated conditioning control logic means and particularly to a conditioning control module for modular fluid control systems.

Pneumatic control systems have been particularly developed for control of heating, ventilating and air conditioning systems for conditioning of air supplied to a comfort zone. A particularly satisfactory system of a modular construction is shown in the copending application of the present inventors entitled "Modular Fluid Control Apparatus and Method of Making" and filed on even date herewith. As more fully disclosed therein, a modular pneumatic control apparatus for controlling mixed air handling units in an air conditioning system includes a single configured manifold module plate having a plurality of function module plug-in connectors and a plurality of input/output plug-in connectors. Function modules have complementary plug-in connectors for connection to the manifold module. The modules are designed with common opposite outer plates having surface passageways abutting a center plate with opening to define a particular circuit. The outer plates have all external ports for defining any function module used in any system. The manifold module is a constant architecture and acts as an interface between the system sensors and load devices and the function modules which create the desired complex control systems. Only a relatively small number of function modules are required to develop the wide variety of control systems necessary to service the commercial, institutional and industrial requirements for heating, ventilating and air conditioning systems. The system is of course directly related to the availability of appropriate function modules to perform various processing of the signals. The modular system is also particularly adapted to an interactive computer based design procedure wherein a series of computer generated questions are answered to define the necessary functional modules and supporting components and connections to completely design a system with only a minimal understanding of the control instrumentation and their characteristics.

The modular pneumatic control provides for incorporation of logic and control means usually provided as separate field installed systems, such as cooling and heating switching and sequences, energy conservation means, safety response functions and the like.

SUMMARY OF THE PRESENT INVENTION

The present invention is particularly directed to function control modules incorporating various conditioning logic and control into the module to generate operating signals in accordance with a plurality of input signals. The function module of this invention includes an internal fluid circuit means and logic and control means for generating a conditioning control output in accordance with a demand signal in combination with a logic system for comparing said demand signal with other inputs to conjointly control the creation of the conditions control output and thereby produce an improved function control of the load.

More particularly, the module is formed with a main circuit board having multiple circuit paths with port means for connection of various logic and control components to the circuit paths to modify the normal operation in response to abnormal conditions. The logic and control compants include various signal comparing and switching devices which may be required to provide the desired complex heating and cooling sequences required for optimum and efficient operation of the air handling equipment including the activation and modulation of the operation of the heating and cooling coils and the face and by-pass dampers. Various interrelated controls may be provided. In one typical embodiment, the module is coupled to receive a zone demand signal from the controlled zone and an outdoor air temperature signal. The demand sensor generates a signal which is isolated and duplicated and then is applied directly to the heating coil and is also applied to the face damper for the heating coil. An interrelated control circuit includes a plug-in comparator and set point regulator coupled to and forming an integrated part of the module for overriding the temperature control of the damper below a selected set point while above the set point only the heating coil is modulated. Similar logic and control components may provide various switchover functions to control various operating devices of the system such as controlling the output of single coil for heating and cooling, controlling minimum ventilating setting of a damper, the humidity set point, fail safe sequences and the like. Thus, in sophisticated air handling systems, a change in the operation of the system operating devices depending upon the relative energy content in the return air and the outdoor air. A switchover control would involve both the heating module and the cooling module with an appropriate set point unit, comparator and associated switching units connected as an integrated part of the modules to sense and modify the signal paths to produce different binary logic fluid signals in accordance with the relative temperature or energy status.

In all such systems, various fail safe features are required. Thus, if an air supply or the air moving fan fails, in whole or in part, certain safety procedures may be required. As the function modules provide a complete control of the several operating devices, the fail safe and/or energy conservation feature can be conveniently and readily applied to any of the control functions for the system.

Thus, the present invention provides an improved function control system for air handling equipment and in particular permits optimization of the system operation with appropriate energy conservation as well as custom applied fail safe control as an integrated part of the central control unit.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a schematic illustration of a mixed air single path face and bypass system incorporating a modular control unit;

FIG. 8 is a schematic illustration of a heating function module including a face and bypass damper control;

FIG. 9 is a schematic illustration of a heating function module and a cooling function module establishing a switchover control;

DESCRIPTION OF THE ILLUSTRATED EMBODIMENT

Figure 3:
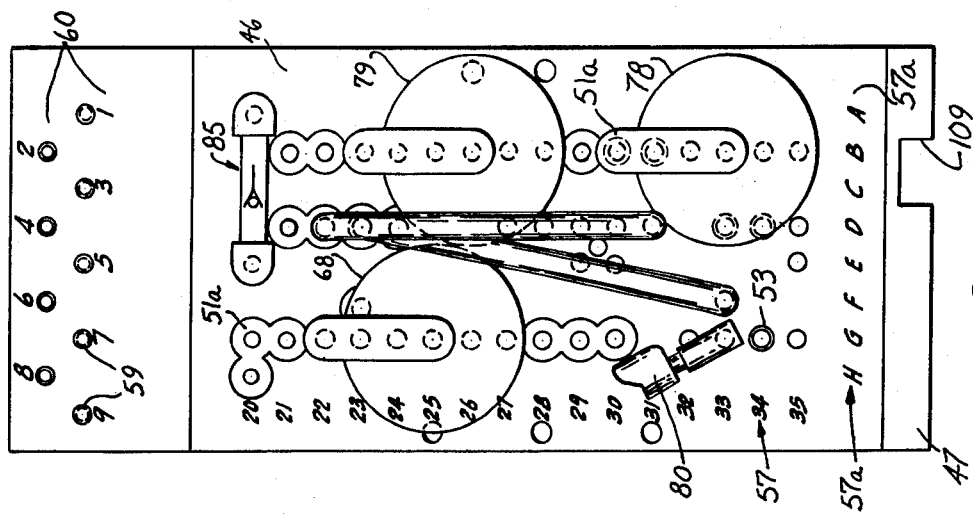
FIG. 3 is a bottom view of a function module.

Referring to the drawings and particularly to FIG. 1, the present invention is shown for controlling of a mixed air, single path air handling system for supplying conditioned air 1 to an enclosed area or building 2 which may include one or more zones 3. The illustrated system includes an outdoor air duct 4 terminating in the exterior wall of the building. A pneumatically operated damper 5 is mounted within the duct opening and operated by a pneumatic cylinder motor 6 for selective opening and closing of the outdoor air duct 4 in complementary action with a return air damper subsequently described. The duct 4 extends inwardly to a supply duct 7 which discharges into the zone 3. The supply duct 7 includes a common heating and cooling source which includes a coil 10 selectively piped to a source of hot water or the like for heating of the air 1 as it passes through the coil and into the conditioned zone 3, or to a source of cold water or the like for corresponding cooling of the air. The coil connections to the several sources include similar control valves 11 each having a pneumatic operator 12 for selectively supplying of water to the coil for modulating the heating or cooling of the air 1 passing over the coil and then supplied to the conditioned zone 3. The duct 7 includes a bypass portion 12a which extends around the coil and a damper 13 is pivotally mounted to the inlet side of the coil and bypass portion to deflect the air into the bypass portion. The damper 13 is positioned by a pneumatic operator 15 to selectively bypass the air around the conditioning coil 10. A fan 16 is mounted in the common supply duct 7 for moving of air through the supply duct 7 and to the conditioned zone 3. In addition, a moisture supply means 17 is shown mounted in the supply duct and connected to a source of water. A control valve 18 in the connection line has a pneumatic operator 19 for controlling supply of moisture to the air as it flows through the common duct 7. The supply of air is balanced by exhausting a corresponding quantity of air through an outlet duct 20. An exhaust duct 21 is connected to the outlet duct and the mixed air system, a return air duct 22 is connected between the outlet duct 20 and the supply duct 7. The exhaust duct 21 extends to the exterior of the building. A pneumatically operated damper unit 23, similar to the outdoor air damper unit 5, is mounted in the exhaust duct to control the exhaust of the outlet air from the building. The outlet air which is not exhausted is diverted through the return air duct 22 to the supply duct 7 immediately upstream of the fan. The return air duct 22 is also provided with a powered damper unit 24 for controlling the opening and closing of the return duct. Damper unit 24 is shown mechanically coupled to the damper 5 by a suitable linkage, to establish opposite positioning of the dampers 5 and 24 such that damper 24 in connection with the outdoor damper 5 maintains a constant flow in duct 7. The exhaust air damper 23 and the outdoor air damper 5 are also generally connected to a common control to maintain a balanced air flow into and out of the system. The dampers 5, 23 and 24, as well as the heating or cooling device 10 and humidification device 17, are generally controlled in accordance with various load demands, outdoor air conditions, return air conditions and other operating conditions of the overall system. For example, as diagrammatically illustrated, a sensor or sensors 25 are provided in the comfort zone 3 to provide a demand signal related to the temperature and/or humidity of the air in the zone 3. An outdoor air temperature sensor 27 is mounted to sense the outdoor air and provide corresponding related signals. The condition of the mixed air may be monitored by an appropriate sensor 28 located immediately upstream or downstream of the fan unit 16. The return air condition can be monitored by sensors 27a mounted in the return air duct. Further, the pressure condition in the supply duct may be continuously monitored by a suitable sensor 29 located in duct 7 to provide a corresponding fan status signal. All such devices, as well as others, are well known components used in air handling systems and consequently no further detailed description thereof is given. The several sensors are connected as input signals to a pneumatic control apparatus or unit 30 which develops operating output signals for driving the pneumatic units of the several dampers 5, 23 and 24, as well as the valves of the illustrated heating or cooling device 10, damper 13 and humidification device 17. The single path mixed air system is shown for purposes of illustration. The total system, as described, provides for developing of the control unit for controlling a dual path system wherein in single cooling and heating duct is provided with separate treating units or an alternate operating unit in such duct, as well as a simple 100% outdoor air unit wherein the return air duct is eliminated.

The control apparatus 30 is constructed in accordance with the teaching of the inventor's copending application as a modular pneumatic circuit control unit including a mounting frame 31 for mounting of the control in a suitable cabinet or the like, not shown. The control apparatus 30 includes four basic components including a main manifold circuit board 32 secured to the mounting frame, a plurality of functional modules 34, 35, 36, 37 and 38, a series of output signal modifiers 39 and 40 and suitable input controllers 41 and 42. The manifold board 32 includes a series of four output connectors mounted to one edge of the board and a plurality of function module connectors along the opposite edge of the board in the illustrated embodiment of the invention. The five function modules 34-38 are releasably connected by complementing connectors to the manifold and supported within the frame 31. The plug-in function modules 34-38 have particular circuit designs to produce particular functions uniquely related to the basic functional requirements of an air handling control system for essentially all air handling units. As more fully developed in the above application, the five functional modules 34–38 include an outdoor air sensing module, an outdoor return air damper control module, a cooling control module, a heating control module and a humidity and auxiliary signal and fan status control module. Each module can only be replaced by a similar functional module, with the particular function module selected to produce the desired processing of appropriate input signals to develop a related output signal for operating the air control dampers and/or the air treating devices. The manifold module 32 serves as the interface between the input signals to the function modules and the output signals from the function modules.

The present invention is particularly directed to the construction of the functional modules circuits and thus no further description of the control unit is given other than as appropriate for a full and clear illustration and description of the invention.

Figure 4:
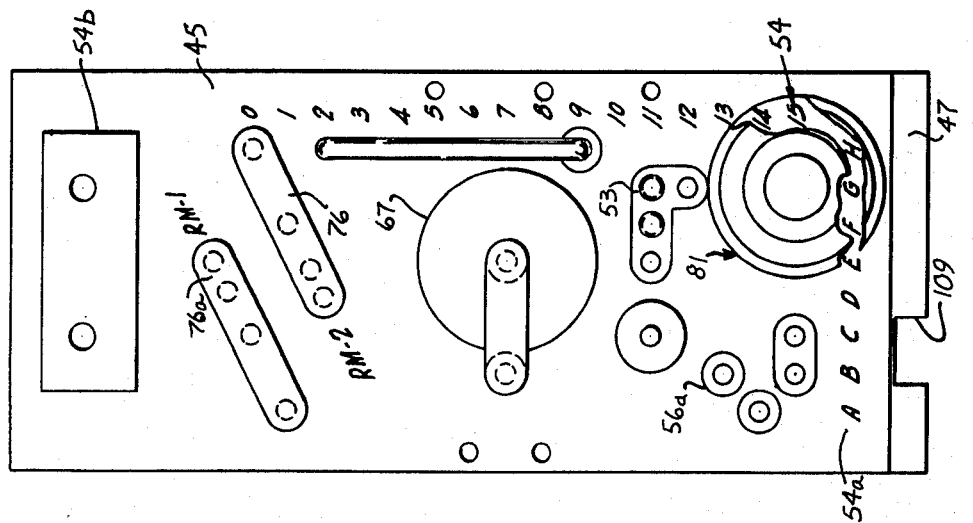
FIG. 4 is a top view of a function module.
Figure 5:
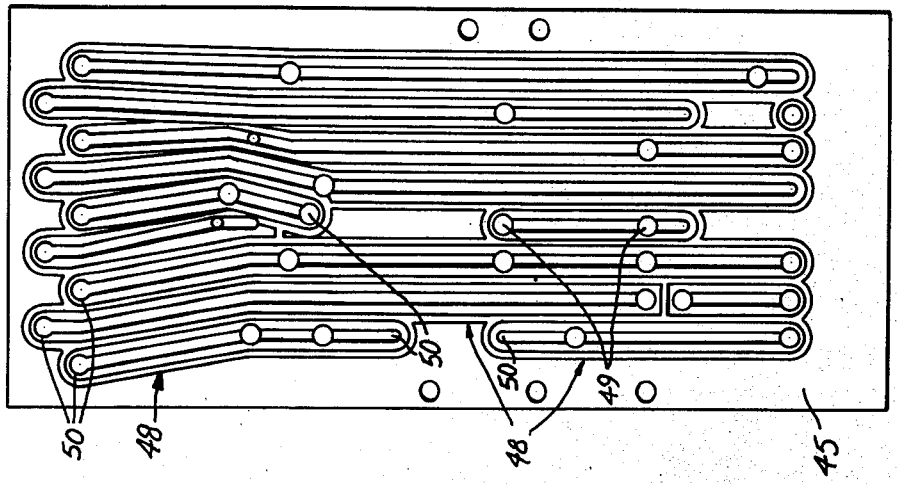
FIG. 5 is a view of the inner wall of the top function module plate, shown in FIG. 2 and taken generally on line 5—5 of FIG. 2.

Each functional module 34–38 includes a flat, plate-like circuit board which is a multiple layered plate assembly, such as more fully disclosed in U.S. Pat. No. 4,188,977 which issued Feb. 19, 1980. The function modules circuit board may be constructed as relatively small compact units. For example, the module may have a length of approximately 5 inches, a width of 2 inches and a depth of approximately one inch. Referring particularly to FIGS. 2–7, a typical function module includes a top plate 45 and a bottom plate 46 separated by a central connecting plate 47. The opposed internal faces of the top and bottom plates 45 and 46 are of a fixed configuration for each and all of the functional modules 34–38 in a preferred embodiment of the invention. The top plate 45 is a molded, plastic member including a series of parallel passageways 48 extending longitudinally of the function module with some extending the total length with end and/or intermediate ports 49 and others extending only partially with appropriate ports 50, as shown in FIG. 5. The ports 49 and 50 are molded into the plate with outwardly projecting encircling receptacle 51 for receiving a plug-in spigot 52 of a fluid logic or control device or a sealing cap 53. The number and location of the passageways 48 and the porting 49–50 is selected to provide for all possible circuit connection required to the top plate in all the possible functional systems available to be made part of a total system, such that a single top plate is formed for all function modules 34–38, regardless of the function performed. The location of said surface port 49 and 50 is identified by coordinate indicia including row indicia 54, shown as numbers 0–15, and column indicia 54a, shown as letters A–H, which is imprinted on the exterior face and along the long and short edge portion of the top plate 45. Thus, for purposes of factory assembly and field test point location identification, the logic or control device is specified by the appropriate letter and number. The top plate 45 is preferably provided with a handle 54b for insertion and removal of the modules.

The bottom plate 46 is a substantially similar molded plastic plate including a plurality of parallel passageways 55 which extend laterally or across the module and thus at substantially ninety degrees to the passageways 48 of the top plate 45. The bottom plate 46 includes a plurality of ports 56 selectively located in communication with the opposite ends of the passageways and intermediate ports 56a to particular passageways, and generally including two or more ports to each passageway. The bottom plate 46 thus includes all ports necessary to produce the connections of flow lines to produce any one of the circuit designs used in the available control systems. The bottom plate 46 also is molded as a universal plate unit for all function modules, such that the total plurality of function modules 34–38 for all functions use the common bottom plate structure. The ports 56 and 56a are similarly molded with outer encircling receptacles 51a to receive a plug-in spigot 52 of a logic or control device, vented to atmosphere or sealed by a suitable sealing plug or cap 53. The location of each port 56 and 56a of bottom plate 46 is also identified by row and column indicia 57 and 57a.

Figure 2:
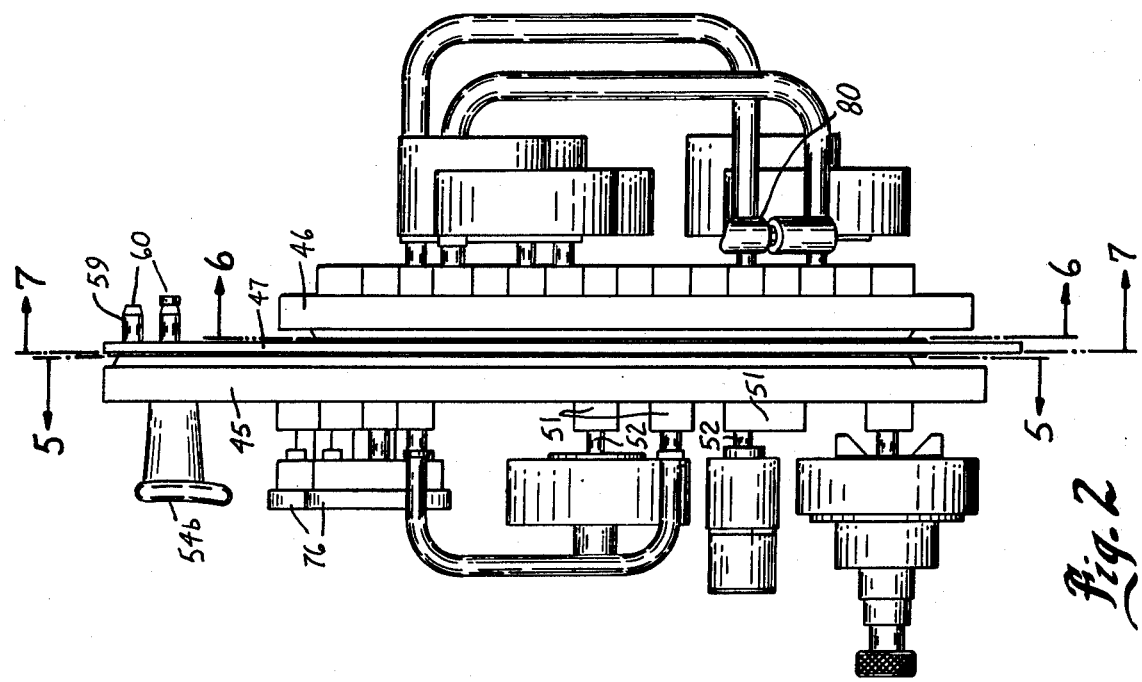
FIG. 2 is an enlarged side elevational view of a typical function module.
Figure 7:
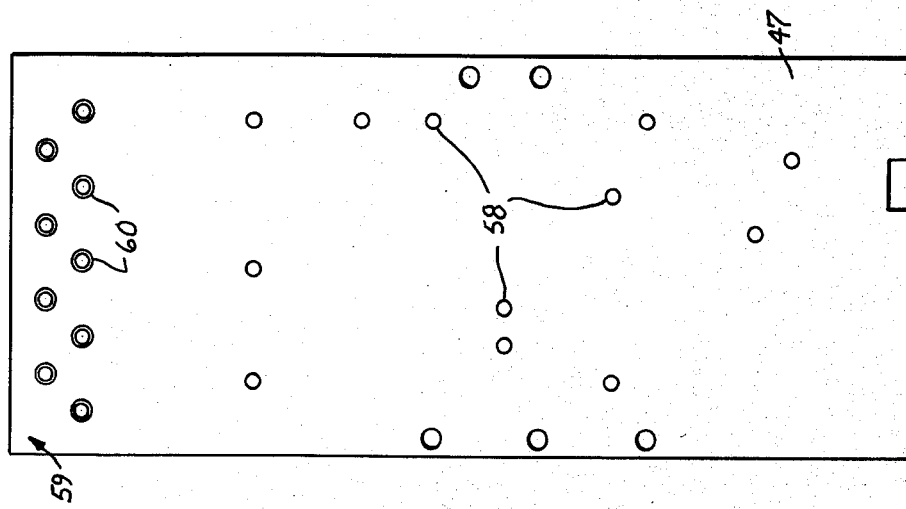
FIG. 7 is a view of the inner connecting plate between the top and bottom plates of a function module to define one unique family of modules and taken generally on line 7—7 of FIG. 2.
Figure 6:
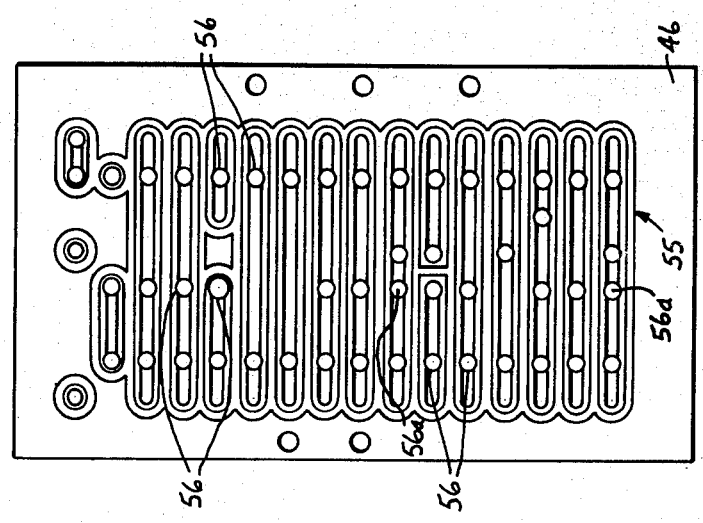
FIG. 6 is a view of the inner face or wall of the bottom function module plate, shown in FIG. 2 and taken generally on line 6—6 of FIG. 2.

As shown in FIG. 7, the center plate 47 for the function module 34–38 is a flat plate having a plurality of appropriately and particularly spaced openings 58 which interconnect specific passageways 48 and 55 to create a particular fluid circuit unique to the function module. The top plate 45 and the center plate 47 extend beyond the bottom plate 46 as shown in FIG. 2, with the function module plug-in spigot connector unit 59 located on the outer end portion thereof. The connection unit 59, as shown in FIGS. 2 and 3, include the spigot connectors 60 secured to the center plate 47 and coupled to the internal passageways 48 in the top plate 45 by openings 58 at the end of the passageways. Five different center plates 47 produce the five different functional modules 34–38. To include the maximum number of the total variable systems which might be encountered in any given field application, the number of family modules may of course be different. Further in any given design, certain infrequently used sensors may be encountered and within a given family, a module with a center plate of different hole configurations may be used. The present invention includes a standardized circuit board for any given function wherein the circuit board can accommodate the wide variety of different specific circuits, with the direct connection of the logic and control devices to the board.

Each function module 34–38 is thus formed as an integrated structure with the three plates bonded by cured epoxy adhesive layers, such as disclosed in the above identified U.S. Pat. No. 4,188,977.

The particular function module is designed and completed by selection of a module circuit board of the proper module family and by connection of the appropriate circuit elements, such as a fluid diode, fluid switches, fluid separators, fluid comparators, fluid boosters, adjustable set point restrictors, regulators and the like. The circuit elements are assembled to the fluid circuit board as by a press fit and plug-in connection to the several surface ports.

The function modules 34–38 are constructed as fixed and factory tested assemblies which merely require releasable plug-in connection to the plug-in section or receptacle. The function modules 34–38 preferably receive the input signal through the edge connector 59, except for manual adjustments, from the main manifold module and supply the output signals to the main manifold module through the edge connector. Thus, the manifold module 32 functions as an interface between the function modules and the input sensors and the operating load devices, as more fully described in the previously identified application.

The function module with plug-in logic and control devices and suitable jumper connections provide for development of various complex and sophisticated heating, cooling and control sequences within the central, integrated control unit 30. The sequences and controls are herein implemented based on the use of standard function modules having particular interrelated plug-in controls. Typically, a control system, which has been required and has previously been separately provided and connected by field installed lines, included heating of the outdoor air in the heat coil, with or without face and bypass dampers, to establish appropriate interrelated modulated and selective control of the damper positions and the operating level of the heating coils.

An embodiment of the invention using a heating function module 37 for controlling of face and bypass dampers is schematically shown in FIG. 8. FIGS. 2-4 illustrate the same module with the several logic and control devices as presently coupled to the described surface ports of the module circuit board. The manifold module 37 receives the outdoor and zone demand signals, as the primary control input. The outdoor air temperature signal is supplied at an input connector port 61 and the zone temperature demand signal is applied at connector port 62 of the module connector 59, shown in FIG. 8. The input signals are generally pressure signals generated from the respective sensors 25 and 27. The heating function module 37 generates a first output signal at an output port 63 of connector 59 for controlling of the heating valve 11 and a second output signal at an output port 64 for controlling the face and bypass damper 13 to the coil face of the heating coil 10 to provide a proper interrelated controlled heating and movement of air 1 to the conditioned zone 3. In the illustrated embodiment of the invention, the fan status signal of the flow sensor 29 is also connected to an input port 65 of the connector 59 to provide a fail safe function and a main air supply is connected at port 66 to supply operating air to the module 37. The illustrated heating function module 37 includes interrelated control devices of plug-in variety which are connected to the several signal passageways as hereinafter described for responding to sensed signals and transmitting related output to the several output lines in a predetermined sequence.

More particularly, the zone temperature signal is connected via a passageway 48 in the top plate 45 to a first fluid repeater 67 and simultaniously to a second fluid repeater 68. The fluid repeaters function to duplicate the input pressure without loading the sensor and are illustrated as well known diaphragm units. Thus, referring to the first fluid repeater 67, a diaphragm 69 defines a dead ended input chamber 70 and an input-/output chamber 71 including a port 72 and an orifice 73 selectively opened and closed by the diaphragm. The orifice port 73 is connected to ground 75 which is usually the atmosphere while the port is connected to control the signal at the output port 63, as follows.

The air supply connection to the module 37 is distributed by a one of a pair of plug-in transmitters 76 and 76a secured to the top plate 45. The transmitter 76 has three paralleled output restrictors 77 connected to the several module passageways for proper distribution of the air supply to the several operating components.

The supply air flows through the dropping restrictor 77 to the several module passageways, and is distributed through appropriate openings 58 to the bottom plate 46 for lateral distribution via passageways 55 to the appropriate spaced lines and returned to the top plate passageway by appropriate plate openings 58, as required.

Thus, the input/output chamber port 72 of fluid repeater 67 is connected to the output of the transmitter 76 in common with the output port 63 for the valve operator 12 of valve 11. The temperature demand signal port 62 is connected to the input chamber 70 and thus the demand signal is constantly applied to the heating coil valve 11.

The output of the repeater 68 is similarly connected in common to the output port 64 for driving the operator 15 of the face damper 13 and to a second supply connection from the main air supply transmitter 76. The outdoor air temperature signal is combined with the zone temperature signal from the repeater 68 to provide a conjoint control of the face damper 13 as follows. The outdoor air temperature signal port 61 is connected to a fluid repeater 78. The output of the repeater 78 is applied to a second repeater 79 and to ground through a dropping resistor 80. The second repeater 79 has its orifice connected to the damper output passageway and port 64 in common with the output of the repeater 68 to provide a conjoint control of the output pressure at port 64, as follows.

The repeater 78 functions as a switching device with the switching levels set point controlled by a fluid regulator 81. The regulator 81 is illustrated as a well known diaphragm unit similar in structure to the fluid repeaters. Thus, the regulator 81 includes a diaphragm 82 defining a sealed input/output chamber and having an orifice connected to ground and an output port connected in common to the transmitter 76 and to the chamber of repeater 78. A threaded adjustment screw unit 83 is coupled to compress a preload spring 84 against the diaphragm 82 which moves to close its orifice. The setting of the adjustment screw unit 83 controls the compression of the spring 84 and thereby the required pressure necessary within the regulator chamber to move the diaphragm 82 to open the orifice. The regulator 81 thus functions in a known manner to establish a predetermined back pressure in the supply passageway from the transmitter 76 to the regulator which is held by movement of the diaphragm 82 to maintain a balanced condition. The outdoor air temperature signal is a pressure which is applied to the input chamber of the fluid repeaer 78. As long as the outdoor temperature pressure is above the regulated pressure supplied to the fluid repeater 78, the fluid repeater 78 is held closed. The output passageway or line of the repeater 78 is then allowed to exhaust through the dropping resistor 80 to the atmosphere and the repeater 79 is held opened. The opening of the orifice of the repeater 79 bleeds the pressure signal from the output damper connector port 64. The pneumatic operator 15 is then actuated to retract the damper 13 and open the coil face of coil 10 completely.

When the outdoor air temperature drops below the set point pressure, the fluid repeater opens and transmits a corresponding pressure signal to the repeater 79, which applies the corresponding pressure to the damper port 64 in common with the zone temperature related repeater 68.

The output of the repeater 68 equals the zone signal and the lower of the pressures from repeater 68 and 79 is applied to damper port 64 and thereby to the pneumatic operator of the face damper to modulate the position of the face damper 13 and the air flow through the heating coil 10.

The face damper 13 and the heating valve 11 are thereof simultaneously modulated to modulate the heating below the set point of the regulator 81.

Above the set point of the regulator 81, however, the face damper 13 opens completely and only the valve 11 will be modulated.

In each function module having a control function, the controlling or demand input signals are connected to a fluid repeater, such as repeaters 67 and 68, which serves to isolate the input signal and duplicate the input signals. As a result of this isolation and separation, switching features can be incorporated into the module without disturbing the input demand signal, such as described above the face damper. Further, for servicing and the like, the several load devices which might malfunction are isolated and readily identified.

The fan input signal at port 65 is connected in a safety override circuit by a fluid diode 85 to the damper control port 64. The fluid diode 85 is pressed to the appropriate module ports and is constructed to conduct only to the fan port 65. So long as the fan operates, the fan signal at port 65 closes the diode 85. If the fan should stop or significantly slow down, the pressure from the fan transmitter 29 drops to a relatively low level. The pressure in the signal passageway to port 64 then bleeds through the diode 85, and damper port 64 drops to a correspondingly low level. As the result, the pneumatic operator 15 opens the face damper 13 completely, in much the same manner as that resulting from the opening of the repeater 79. Thus, the control system of the heating module of FIG. 8 provides the desired control directly at the control unit 30 as a result of the plug-in attachment of the illustrated repeaters, regulators and the coupling diodes without the necessity of field wiring or controls. If it is desired to modify the control system, the heating function module can be directly replaced with another module appropriately modified. For example, the fan status feature could be removed by providing an appropriate functioning module with the diode removed and the appropriate ports plugged.

Complex heating sequences may involve other controls. For example, the single cooling and heating coil may be alternately connected to hot water for heating and cold water for cooling. Switchover is usually provided by a separate control based on a comparison of the temperature or enthalpy content of the outdoor air and the return air. A standard function module with appropriate plugged-in logic and control components provides a convenient switchover signal at the control unit 30. An appropriate two-function module combination is schematically illustrated in FIG. 9. In this instance, both a cooling function module 36 and a heating function module 37 are connected to conjointly control the output signal at an output connector port 86 from the heating function module 37. Port 86 is connected to actuate the heating and cooling valve. The external valving is a standard well known system and no further description thereof is given.

The zone demand signal is applied at the input port 87 of the heating function module 37 and connected to control the transmission of supply air pressure to the output passageway port 86. The supply air is again coupled to the heating function module 37 through one branch of a standard plug-in transmitter 88, the output of which is connected directly to the valve output port 86. The zone demand signal pressure is applied to the input chamber of a first fluid repeater 89. The output of the fluid repeater 89 is connected between a by-pass fluid repeater 90 and the common connection of the transmitter 88 and the valve output port 86. The output of fluid repeater 90 is also connected to an atmospheric reference and the input chamber is connected to a control signal from the output of the cooling function module 36. With the repeater 90 opened, the orifice of the fluid repeater 89 is connected to atmosphere through repeater 90. In this mode, the zone demand signal modulates the positon of the fluid repeater 89 and thereby selectively modulates and controls the output pressure level at the heating/cooling passageway and port 86. This establishes the heating function mode with hot water supplied to the coil. When repeater 90 is held closed, the repeater 89 is disabled in that the supply air pressure cannot be exhausted through repeater 89 and full supply pressure is supplied to output port 86. During the heating control mode, an R.A. (reverse acting) booster 105 pivots a maximum signal to the repeater 107, as more fully described hereinafter, and thereby preventing the escape of the control signal air to atmosphere.

The repeater 90 is closed in response to operation of the cooling function module 36, as follows.

The cooling function module 36 responds to the relative energy content of the outdoor air. The illustrated module 36 includes a set point outdoor air sensing branch 92 similar to that of heating module shown in FIG. 8, and an output modulating branch 93. As presently described, the circuit of module 36 requires four air supply inputs, and a pair of standard three output transmitters 94 are provided to properly power the system.

More particularly, referring to FIG. 9, branch 92 includes a fluid repeater 95 coupled to the input port 61 which is connected to outdoor air temperature sensor 27 which may be any conventional leakport type sensor. Port 61 is also connected to a branch of transmitter 94 with the pressure to repeater 95 modulated by sensor 27. A set point pressure regulator 96 is connected and sets the switching level of repeater 95, as in the embodiment of FIG. 8. A bleed resistor 97 and an output repeater 98 are also similarly connected in circuit with the output of repeater 95 and the branch 93. The output of repeater 98 is referenced to ground through a dropping restrictor 99.

The output signal of repeater 98 is connected directly by an appropriate module passageway 48 in the top module platee 45 to a coupling or output port 100 of the connector 59, shown in FIG. 8. The mainifold 32 couples port 100 to an input port 101 of the connector 59 of module 37 which is connected by the internal flow lines or passageways to the input chamber of fluid repeater 90. The branch 92 thus functions to close repeater 90 and effectively remove the zone temperature actuated repeater 89 from the circuit whenever branch 92 and particularly repeater 98 transmits an output signal. This latter condition is created whenever the outside air temperature rises above the set point pressure of regulator 96.

The output passageway from repeater 98 is also applied to branch 93 and in particular to operatively connect it into circuit with the inactivation of the repeater 89.

Branch 93 includes a fluid repeater 102 having its input chamber connected to zone temperature input connector port 103, which is coupled to the zone demand sensor 25. The output of repeater 102 is coupled to an output port 104 of the module connector 59 and within the manifold module 32 is coupled to a reverse action booster relay 105, the output of which is connected to an input port 106 of module 37. A modulating fluid repeater 107 has its input chamber coupled to the input port 106 and its output connected between atmosphere and the heating/cooling valve port 86 of module 37. The repeater 107 is of course operable to control the pressure level at port 86 by modulating of the ground connection through its orifice, whenever the zone repeater 102 of module 36 transmits a signal thereto.

Switching fluid repeater 108 is connected in branch 93 to allow operation of repeater 102, as follows. Repeater 108 has its input connected to the output of repeater 98 of branch 92. The output of repeater 108 is connected such that it by-passes repeater 102 to ground when open. When the outdoor air temperature rises above the set point level, the repeater 98 opens and establishes a switching signal which allows repeater 108 to close, thereby operatively connecting repeater 102 into circuit. As previously described, repeater 90 also closes and operatively cuts off the effects of repeater 89. The output pressure at port 86 is now modulated by the response of repeater 102 to the zone temperature sensor 25. Repeater 102 again isolates and repeats the demand signal which pilots the R.A. booster 105. This reverses the demand signal which is applied to repeater 107. The repeater 107 selects the lowest of the values, which is that from the booster 105, and applies the signal to the now cooling coil valve through port 86. Thus, the outdoor sensing branch 92 creates a switchover binary logic signal at the output of repeater 98 which is simultaneously applied to both modules 36 and 37 to determine which is in effective control and to automatically switch the control therebetween in accordance with the energy state of the outdoor air.

These and various simpler and even more complex function modules are factory assemblied and tested to define families of function modules which can be combined to create the required control systems, such as more fully disclosed in the present inventors' previously identified copending application.

The present invention has been described with respect to a heating, ventilating and air conditioning system, which may be a variable volume or a constant volume air flow system, to illustrate the best embodiment presently contemplated by the inventors. The construction of a series of unique function modules which are separated into distinct groups or families of modules will be readily applied by those skilled in the art to other fluid control systems having a plurality of different load devices which are functionally interrelated and which are also related to various demand and/or condition related signals.

Although the module has been described with plates 45 and 46 identified as top and bottom plates for convenience of description, the modules and the control may be mounted in any desired orientation. Thus, such descriptive definition of the illustrated embodiment is not a limitaion on the structure. The center plate of FIG. 7 is illustrated for the module 35 and FIGS. 2–4 illustrate the function module 35 constructed with the components properly connected to the modules to establish the circuit of FIG. 8. Center plates for the modules 34, 36, 37 and 38 are essentially the same rectangular plate construction as for module 35, with the coupling openings 58 appropriately located for the various circuit configurations required to produce the desired function. Appropriate center plates are shown for such modules 34, 36, 37 and 38 in FIGS. 10–13 inclusive. The latter plates 100, 101, 102 and 103 are of course also secured as an integrated part of a module circuit board including the same top and bottom plates 45 and 46 and adapted to receive the appropriate logic and control devices connected to the surface ports of the top and bottom plates 45 and 46 for forming specific function modules defining the family of function modules.

The several modules 34–38 have keying means provided to distinguish the several families of modules and to restrict the insertion into a related receptacle on the manifold board of manifold module 32. Thus, each of the center plates 47 and 100–103 in FIGS. 10–13 is provided with a keying notch 109 along the short edge opposite from the connector 59. The notces 109 in the different function center plates 47 and 100–103 are differently spaced along the edge and thereby uniquely define the plate and the module board formed therefrom for clearly distinguishing the different family of modules. In the illustrated embodiments, as most clearly shown in FIGS. 2–4 and FIGS. 5–6, the center plate 47 is longer than either of the top and bottom plates 45 and 46 and in the assemblied module the notched edge projects outwardly to expose the notch 109 for interlocking only into the proper module location for the corresponding function. Thus, as shown in applicants' copending application, and as shown in FIG. 1, the board may include corresponding located pins 109a defining complementing keying means for cooperative positioning and interlocking of each board.

Further, the bottom plate 46 is significantly shorter so as to expose the plug-in input/output connector assembly 59 on the bottom side of the center plate 47.

A set of typical function module systems for the five function modules 34–38 is shown in FIGS. 14–18 and described, with the location of the illustrated logic and control components specified by the appropriate indicia 54 and 57.

Figure 14:
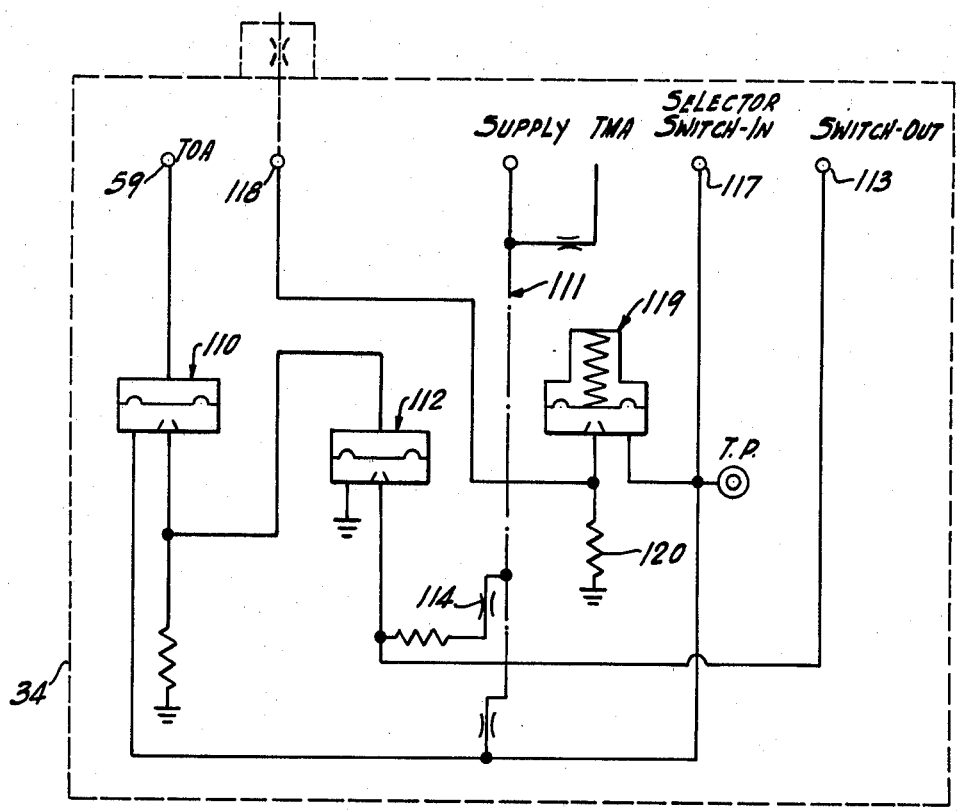
FIGS. 14-18 are schematic illustrations of the module circuits for each of the five modules.

FIG. 14 illustrates a typical circuit for one function module of the family of function modules 34. In the outdoor air sensing module of FIG. 14, a repeater 110 is connected to the outdoor air sensor 27. The output of the repeater 110 is connected to the module air supply transmitter 111 and to a repeater 112. The output of repeater 112 is connected to a summer/winter output port 113 in common with a supply connection 114. When repeater 112 is open, the port 113 is coupled to ground. When the repeater 112 is closed, the supply pressure appears at the summer/winter output port 13. The module circuit is again supplied from the transmitter 111 having a series of separate paralleled restrictors. A pressure regulator 119 is connected to the restricted supply air connection to repeater 110 and sets the switchover level of the outdoor temperature signal. The pressure regulator 119 is normally connected to atmosphere through a port 118 which is adapted to receive an override control device as subsequently discussed. Thus, repeater 110 functions as a comparator between the pressures to the opposite sides of the diaphragm. As long as the regulated pressure is above the sensed pressure, repeater 110 is open, repeater 112 is closed and a high pressure appears at the summer/winter port 113. If the outdoor air signal level rises above that of regulator 119, the repeater 110 closes and repeater 112 opens and drops the level at port 113 to atmosphere. A condition override and manual override signals are provided in FIG. 14. A manual summer/winter selector switch 116, which is provided as a part of the control 30, is operable to open and close the connection to an input port 117 of the module connector 59. The port 117 is connected to the supply connection to repeater 110 and to regulator 119. The switch is adapted to cap port 117, vent port 117 to atmosphere or apply a pressure to port 117 in excess of the maximum output of the regulator 119. When capped, the system operates in the normal mode. When port 117 is the outdoor air temperature signal closes repeater 110, repeater 112 opens and the level at port 113 drops. If the positive pressure is applied to port 117, the repeater 110 is held open for all possible other conditions, repeater 112 is closed and the level at port 113 is held high.

In addition, a condition override device is connected to port 118. The override device may be any suitable two-position device, not shown, such as a device to indicate if cooling is available or not. If cooling is available, port 118 is open and permits normal operation of the system. If cooling is not available, the device closes port 118 which prevents venting of the supply to atmosphere through the regulator 119. The restricted supply pressure holds repeater 110 open and repeater 112 closed, whereby the signal level at port 113 is held high.

Figure 10:
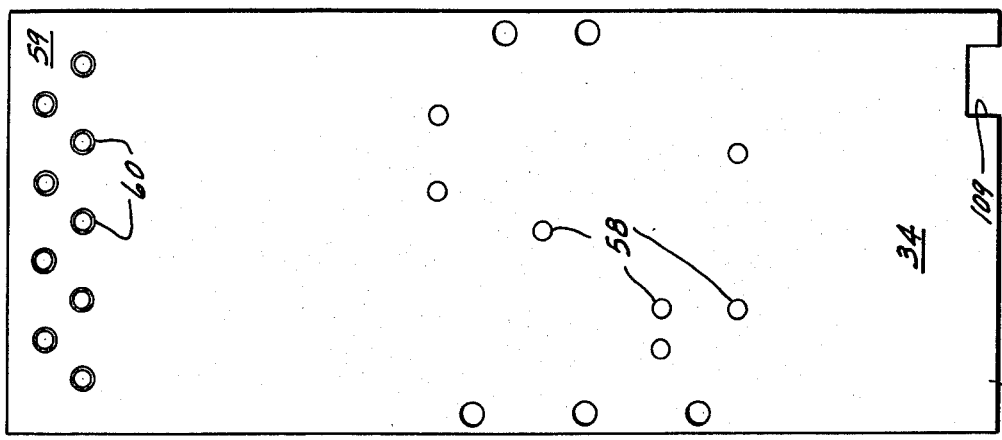
FIGS. 10-13 are views similar to FIG. 7 illustrating the inner connecting plate to define the four other unique family of function modules to provide a complete five module assembly as shown in FIG. 1.
Figure 11:
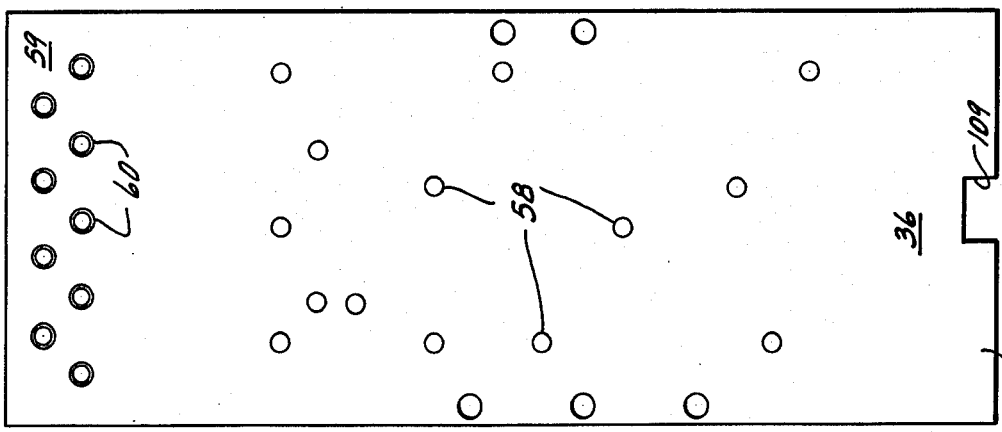

The family of modules 34 from which the circuit of FIG. 14 is constructed includes a center plate 100, as shown in FIG. 10. The specific module would be completed by plug-in of the standardized repeater, resistors, restrictors, transmitting to the function module circuit board including such plate 100 as typically shown in FIGS. 2-4.

Figure 14A:
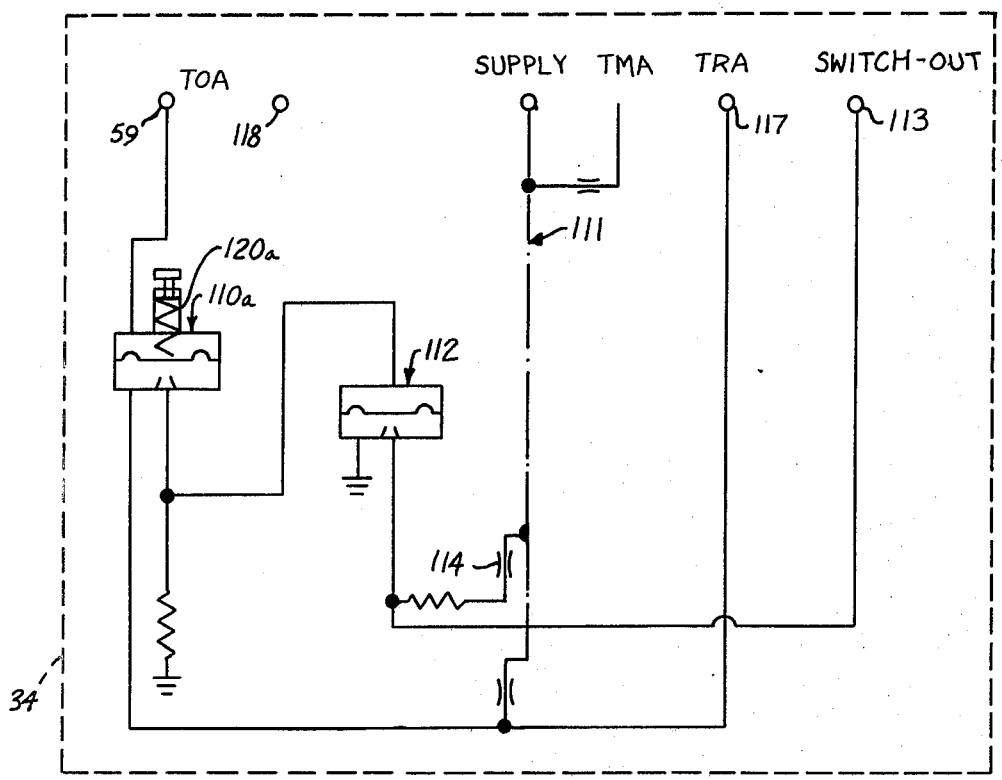

The material listing for such a module would identify the components and the location thereof with respect to the imprinted indicia 54-54a, 57 and 57a on the top and bottom plates 45 and 46 as follows.

example, the outdoor air family of modules includes a particularly unique function module, as shown in FIG. 14a in which the pressure regulator 119 and the two-position device at input port 118 have removed. The module 34 of FIG. 14a is constructed with plug-in diaphragm signal processing components to monitor the relative energy content of the outdoor air and the return air of the conrol system based upon such comparison, to generate a switching signal at the switch out port 113. In this particular module, the input port 117 of the circuit board is adapted to be coupled through the manifold to the outdoor air sensor 27. An adjustable diaphragm fluid comparator 110a is connected to the outdoor air temperature port 59 and to the port 117, which is in this embodiment coupled to the return air sensor 27a. The sensors 27 and 27a produce related pressure signals at ports 59 and 117. The diaphragm of comparator is adjustably biased, as by an adjustable spring 120a, toward its orifice to establish a predetermined force tending to close the orifice which is connected to the output port 113 in the same circuit as the repeater 110 in FIG. 14. The return air port 117 is coupled to the input-/output chamber and the now connected outdoor air port 59 is connected to the input chamber. The comparator 110a, thus the outdoor air energy with the return air energy. The adjustable spring introduces a differential response to the two variable inputs. The module thus provides a floating energy content monitor in which the outdoor air energy must decrease by a certain percentage below the return air energy to open the comparator 110a and switch the output signal at port

| | FUNCTION MODULE ASSEMBLY FM-1100-1 | | | | | | | |
|---|---|---|---|---|---|---|---|---|
| ITEM | COMPONENT DESCRIPTION | U/M | COMPONENT NO. 27 | DEPT. 38 39 | QUANTITY 42 43 | STOCK 52 53 | 80 FLOOR 56 | |
| 1 | MODULE SUBASSY FOR FM 1000 SERIES | EA | 25 794 | 5 | 1 | 0 | | |
| 2 | REGULATOR SUBASSY, PRESSURE G15 (CTR) - F15 | EA | 25 760 | 6 | 1 | 0 | | |
| 3 | SUBASSY., T.P. ADPTR. F11 | EA | 25 820 | 18 | 1 | 0 | | |
| 5 | REPEATER SUBASSY E7 (CTR) - B7, G30 (CTR) - G27 | EA | 25 727 | 3 | 2 | 0 | | |
| 6 | MANIFOLD SUBASSY, TRANSMITTER RM-1 | EA | 25 787 | 56 | 1 | 0 | | |
| 7 | MANIFOLD SUBASSY, TRANSMITTER RM-2 | EA | 25 787 | 48 | 1 | 0 | | |
| 8 | HANDLE MODULE | EA | 24 3004 | 1 | 1 | 0 | | |
| 9 | NAMEPLATE, FUNCTION MODULE | EA | 24 3103 | 13 | 1 | 0 | | |
| 10 | PLUG 1/16 SPIGGOTS 4 & 9 | EA | 24 3101 | 6 | 2 | 0 | | |
| 12 | PLUG 3/32 A14, B24, B27, ,C11, C15, D24, E11, E30, E32, G11, G12, G32, H15 | EA | 24 3026 | 8 | 13 | 0 | | |
| 17 | RESISTOR & END CAP SUBASSY H2 - H9 | EA | 25 882 | 27 | 1 | 0 | | |
| 18 | RESISTOR & END CAP SUBASSY (D27 - D34) (B32- B25) | EA | 25 882 | 19 | 2 | 0 | | |
| 21 | CHEMICAL, BROMOCHLOROMETHANE | QT | 02 216 | 114 | 0 | 0 | | |
| 22 | LABEL, NON-RIDGID, ADJUSTMENT | EA | 24 3124 | 7 | 1 | 0 | | |
| 24 | SPACER, P.C. BOARD | EA | 02 45 | 424 | 1 | 0 | | |
| 11 | ORFICE, AIR RESTRICTING (B32 - B25) (D27 - D34) (H2 - H9) | EA | 94 268 | 40 | 6 | 0 | | |
| 26 | TEST POINT ADAPTER F11 | EA | 24 3050 | 1 | 1 | 0 | | |

The several modules within each family have different functional configurations to provide essentially the necessary control for practically all possible system specifications. All such different modules are made up of the standard components with the ports oriented for plug-in connection to the module circuit boards. For 113. The specific module 34 thus provides a floating energy content monitor circuit which may be directly applied, without the necessity of complex processing of the signals. The monitor module 34 is made adjustable because the desired percentage differential normally is dependent upon the environment within which the control system operates. For example, the moisture content of air varies with geographical areas, and the comparator would be set in accordance with the normal state of the outdoor air. In practice, the field designer would be furnished with information as to the appropriate differential setting or moisture content for the area by an appropriate bulletin, table or the like. The designer would then supply the appropriate desired setting to the factory where the module would be adjusted and locked in place, particularly when designed in accordance with the use of a computer based interactive program as disclosed in the previously identified application.

Figure 15:
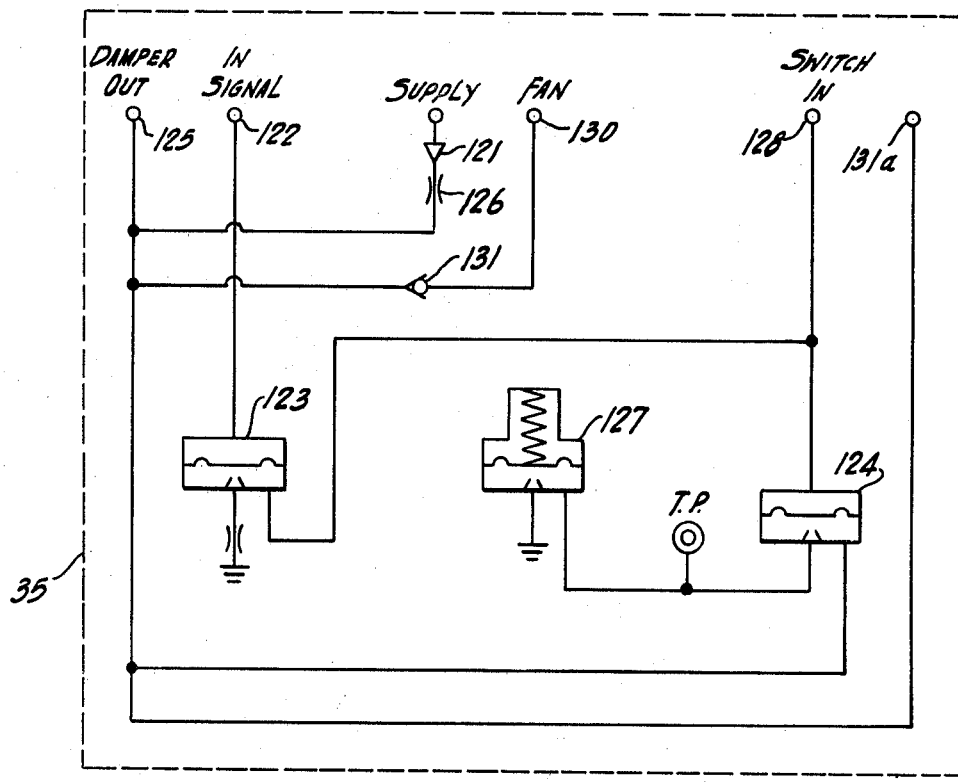

FIG. 15 illustrates a typical circuit for the outdoor/return air damper control module 35, with the supply signal is applied to an input port 130 and coupled by a fluid diode 131 directly to the damper output port 125.

A further interlock signal, such as mixed air temperature control signal, is also applied to a port 131a connected directly to the damper output port. The control signal is derived from suitable exhaust type control which when open will bypass the supply from the damper port 125 for closing the outdoor damper to minimize introduction of cold air. The illustrated circuit is directly developed by using a standard function module board including the center plate 47, shown in FIG. 7, of an outdoor damper family module 35, with the appropriate connection of the repeaters and other components, generally shown in FIGS. 2–4 and more particularly specified as follows.

Figure 16:
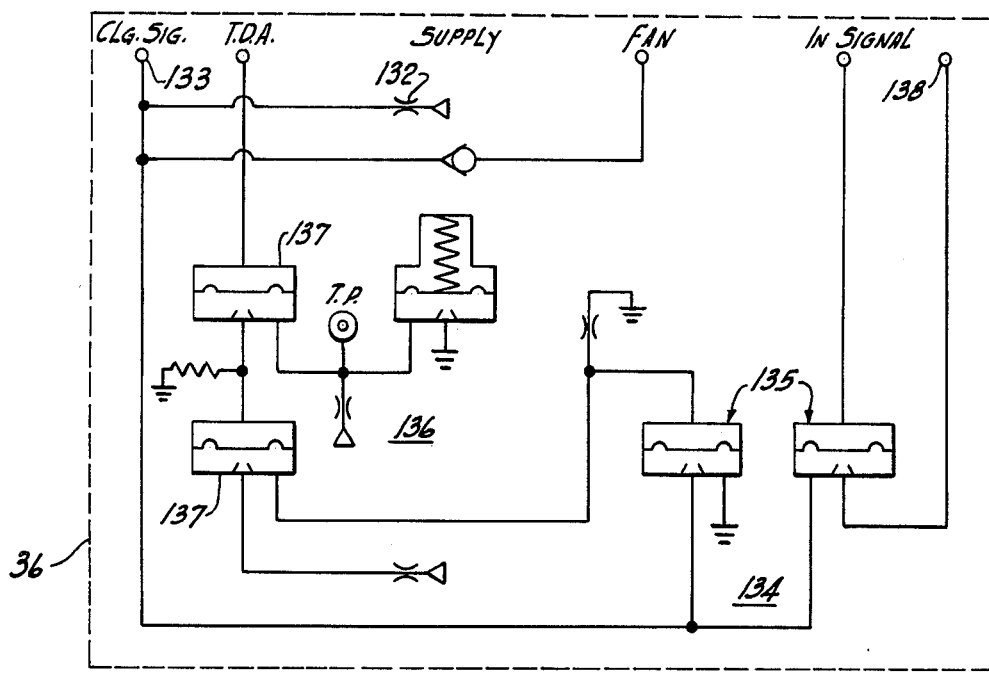

| | | | | | | | | | 80 FLOOR |
|---|---|---|---|---|---|---|---|---|---|
| | FUNCTION MODULE ASSEMBLY 2100-2 | | | COMPONENT NO. | DEPT. | QUANTITY | | STOCK | |
| ITEM | COMPONENT DESCRIPTION | U/M | 27 | | 38 39 | 42 43 | | 52 53 | 56 |
| 1 | MODULE SUBASSY FOR FM 2000 SERIES | EA | 25 | 794 | 13 | | 1 | 0 | |
| 2 | REGULATOR SUBASSY, PRESSURE G15(CTR) - H15 | EA | 25 | 760 | 6 | | 1 | 0 | |
| 3 | SUBASSY., T.P. ADPTR. H9 | EA | 25 | 820 | 18 | | 1 | 0 | |
| 4 | ORIFICE, AIR RESTRICTING - FLUIDIC E11 | EA | 94 | 268 | 59 | | 1 | 0 | |
| 5 | REPEATER SUBASSY E7 (CTR) - B7, G30 (CTR) - G27 | EA | 25 | 727 | 3 | | 2 | 0 | |
| 6 | MANIFOLD SUBASSY, TRANSMITTER RM-1 | EA | 25 | 787 | 13 | | 1 | 0 | |
| 7 | MANIFOLD SUBASSY, TRANSMITTER RM-2 | EA | 25 | 787 | 5 | | 1 | 0 | |
| 8 | HANDLE, MODULE | EA | 24 | 3004 | 1 | | 1 | 0 | |
| 9 | NAMEPLATE, FUNCTION MODULE | EA | 24 | 3103 | 99 | | 1 | 0 | |
| 10 | PLUG 1/16 SPIGGOT 4 & 7 | EA | 24 | 3101 | 6 | | 2 | 0 | |
| 11 | ORIFICE, AIR RESTRICTING - FLUIDIC D23, H20, A20, E20 | EA | 94 | 268 | 40 | | 4 | 0 | |
| 12 | PLUG 3/32 A14, B23, B25, B27, B31, , D27, D13, , E30, F11, F15, G11, G20, G23, G25, , H2 | EA | 24 | 3026 | 8 | | 15 | 0 | |
| 13 | DIODE & END CAP SUBASSY A20 (PT) - E20 | EA | 25 | 800 | 2 | | 1 | 0 | |
| 14 | TUBING, PRE-CUT D23 - H20 | EA | 94 | 416 | 74 | | 1 | 0 | |
| 21 | CHEMICAL, BROMOCHLOROMETHANE | QT | 02 | 216 | 114 | | 0 | 0 | |
| 22 | LABEL, NON-RIDGID, ADJUSTMENT | EA | 24 | 3124 | 15 | | 1 | 0 | |
| 24 | SPACER, P.C. BOARD | EA | 02 | 45 | 424 | | 1 | 0 | |
| 26 | TEST POINT ADAPTER H9 | EA | 24 | 3050 | 1 | | 1 | 0 | | coupled through a transmitter 121. In the illustrated embodiment, the temperature of the air in one of the ducts of the system is sensed and a demand input signal applied to an input port 122. Fluid repeater 123 isolates and duplicates the input signal to the input of second repeater 124, the output of which is connected to the damper output port 125 in common with air supply connection 126. The repeater 124 connects the port 125 to atmospheric reference in series with a pressure regulator 127. The input signal thus modulates the supply connection and the level of the damper output signal at port 125. Various interlocks are shown in the specific module 35 of FIG. 14. The summer/winter switching signal is shown connected to the input port 128 which is connected to input of the repeater 124 in common with the output of repeater 123. The switching signal is derived through the manifold module 32 from any one of the first modules 34 through the port 113 of FIG. 14 in the illustrated embodiment. Additionally, a fan status FIG. 16 illustrates a cooling module circuit similar to that illustrated in FIG. 9. In FIG. 16 the outdoor air temperature signal is connected as a leakport sensor 27. A supply connection 132 and a fan status input signal are provided and connected directly to a cooling signal port 133. A control branch 134, including a pair of repeaters 135 and an outdoor air temperature components branch 136, including the fluid components similar to that of FIGS. 8 and 9 are connected to control the output signal level. In addition in FIG. 16, a humidity related signal is applied at an input port 138 and connected to the output of the repeater 135 and operable to control the cooling signal output for purposes of dehumidification. No further description of the output is given because the components operate as described for FIGS. 8 and 9. The circuit would be developed by using the standard family module board with the center plate 101 of the cooling family module 36 with the appropriate component connections generally as shown in FIGS. 2 and 4 and more particularly specified as follows.

signal to the other modules 34–36. The status signal also is applied in the heating module circuit of FIG. 17 and

1 FUNCTION MODULE ASSEMBLY FM 3300-1

| ITEM | COMPONENT DESCRIPTION | U/M | COMPONENT NO. 27 | | DEPT. 38 39 | QUANTITY 42 43 | 80 FLOOR STOCK 52 53 56 |
|---|---|---|---|---|---|---|---|
| 1 | MODULE SUBASSY FOR FM 3000 SERIES | EA | 25 | 794 | 48 | 1 | 0 |
| 2 | REGULATOR SUBASSY, PRESSURE G15 (CTR) - F15 | EA | 25 | 760 | 6 | 1 | 0 |
| 3 | SUBASSY., T.P. ADPTR. F11, A14 | EA | 25 | 820 | 18 | 2 | 0 |
| 5 | REPEATER SUBASSY E7 (CTR) - B7, G32 (CTR) - G29, B34 (CTR) - B31 | EA | 25 | 727 | 3 | 3 | 0 |
| 6 | MANIFOLD SUBASSY, TRANSMITTER RM-1 | EA | 25 | 787 | 13 | 1 | 0 |
| 7 | MANIFOLD SUBASSY, TRANSMITTER RM-2 | EA | 25 | 787 | 129 | 1 | 0 |
| 8 | HANDLE, MODULE | EA | 24 | 3004 | 1 | 1 | 0 |
| 9 | NAMEPLATE, FUNCTION MODULE | EA | 24 | 3103 | 250 | 1 | 0 |
| 10 | PLUG 1/16 SPIGGOT 3 & 4 | EA | 24 | 3101 | 6 | 2 | 0 |
| 11 | ORIFICE, AIR RESTRICTING - FLUIDIC B25, A20, E20, G20, B29, , D31, D27 | EA | 94 | 268 | 40 | 7 | 0 |
| 12 | PLUG 3/32 B26, B22, B24, B32, B33, D22, D24, D29, D33, , D34, E11, E32, F33, G11, G27, G21, G24, G31, G34, H2, H9, H15, H20, E29 | EA | 24 | 3026 | 8 | 24 | 0 |
| 13 | DIODE & END CAP SUBASSY A20 (PT) - E20 | EA | 25 | 800 | 2 | 1 | 0 |
| 15 | TUBING, PRE-CUT B25-G20, D27-D31 | EA | 94 | 416 | 112 | 2 | 0 |
| 17 | RESISTOR & END CAP ASSEM. B29-ATM | EA | 25 | 882 | 19 | 1 | 0 |
| 20 | ORFICE, AIR RESTRICTING, FLUIDIC .007 ORIFICE B27 | EA | 94 | 268 | 59 | 1 | 0 |
| 21 | CHEMICAL, BROMOCHLOROMETHANE | QT | 02 | 216 | 114 | 0 | 0 |
| 22 | LABEL, NON-RIDGID, ADJUSTMENT | EA | 24 | 3124 | 31 | 1 | 0 |
| 24 | SPACER, P.C. BOARD | EA | 02 | 45 | 424 | 1 | 0 |
| 26 | TEST POINT ADAPTER F11, A14 | EA | 24 | 3050 | 1 | 2 | 0 |
| 27 | REPEATER SUBASSEMBLY G25 (CTR) - G22 | EA | 25 | 727 | 11 | 1 | 0 |

Figure 12:
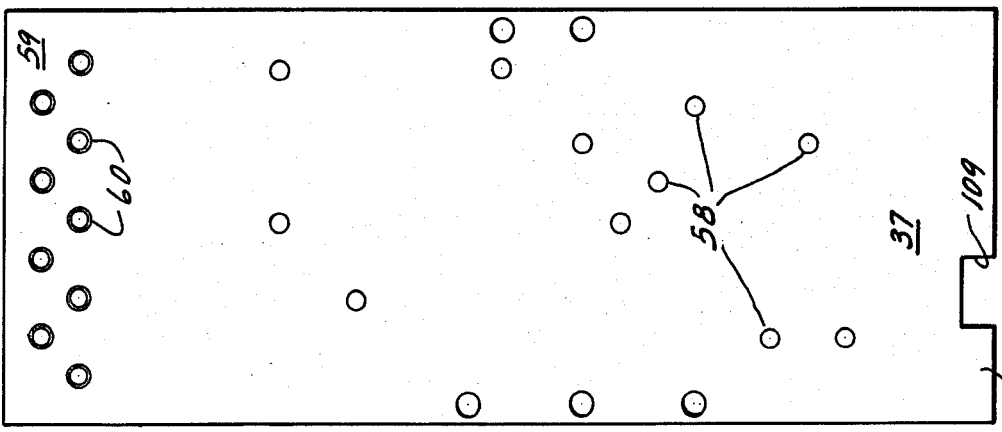
Figure 13:
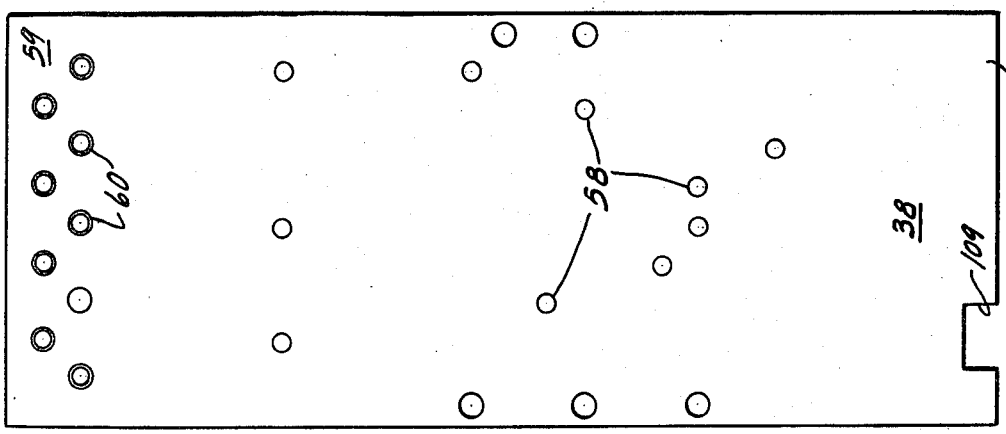
Figure 17:
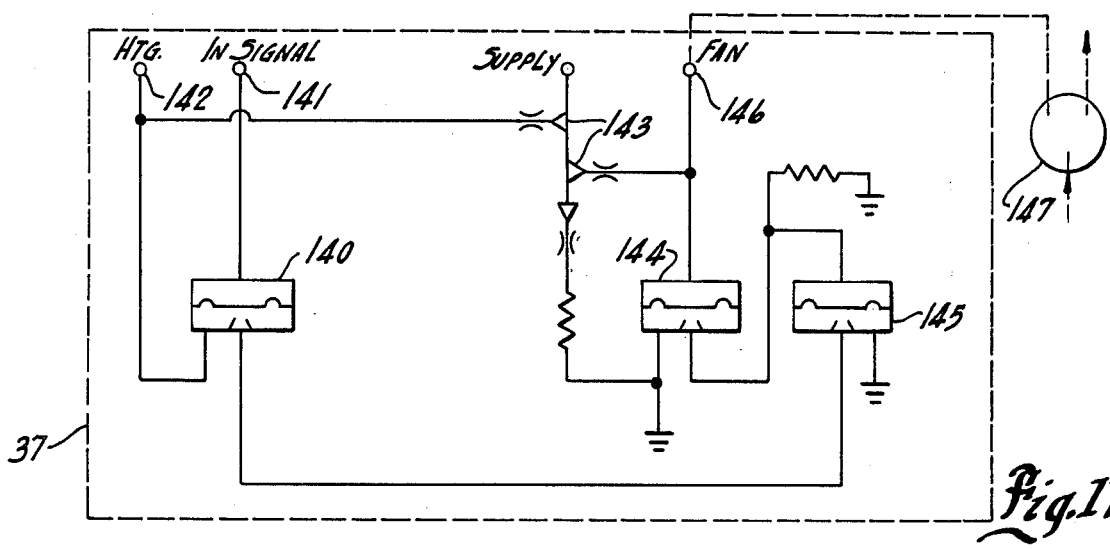

FIG. 17 illustrates a heating module fluid circuit having a relatively simple heating control function. The module including a repeater 140 connected to a demand temperature input port 141 and having an output connected to modulate the pressure at a heating output port 142. A fan status interlock circuit includes an input port 146 to receive a fan status signal, and The heating module 37 also has fan signal port 146 connected to the air supply transmitter 143. This separated circuit is used to supply air to the output of a fan status booster 147 on the main manifold 34. As shown and described in the copending application for distribution of a fan status is particularly connected to operate a repeater 144, the output of which is connected to the input of a repeater 145. The output of the repeater 145 connects the modulating repeater 140 to ground. The repeater 140 normally responds to the temperature input signal and modulate the output pressure at the heating control port 142, except when the fan is off, repeater 145 closes. Full supply air pressure is supplied to port 142. The specific assembly to the appropriate circuit board having a center plate 102, as shown in FIG. 12, for heating function family module is as follows:

FUNCTION MODULE ASSEMBLY FM 4100-3

| ITEM | COMPONENT DESCRIPTION | U/M | COMPONENT NO. 27 | | DEPT. 38 39 | QUANTITY 42 43 | 80 FLOOR STOCK 52 53 56 |
|---|---|---|---|---|---|---|---|
| 1 | MODULE SUBASSY FOR FM 4000 SERIES | EA | 25 | 794 | 56 | 1 | 0 |
| 4 | ORIFICE, AIR RESTRICTING - FLUIDIC D34 | EA | 94 | 268 | 59 | 1 | 0 |
| 5 | REPEATER SUBASSY B25 (CTR) - B28, G25 (CTR) - G22, G33 (CTR) - G30 | EA | 25 | 727 | 3 | 3 | 0 |
| 6 | MANIFOLD SUBASSY, TRANSMITTER RM-1 | EA | 25 | 787 | 64 | 1 | 0 |
| 7 | MANIFOLD SUBASSY, TRANSMITTER RM-2 | EA | 25 | 787 | 13 | 1 | 0 |
| 8 | HANDLE, MODULE | EA | 24 | 3004 | 1 | 1 | 0 |
| 9 | NAMEPLATE, FUNCTION MODULE | EA | 24 | 3103 | 323 γ | 1 | 0 |
| 10 | PLUG 1/16 SPIGGOTS 3, 8, & 9 | EA | 24 | 3101 | 6 | 3 | 0 |

-continued

FUNCTION MODULE ASSEMBLY FM 4100-3

| ITEM | COMPONENT DESCRIPTION | U/M | COMPONENT NO. 27 38 | | DEPT. 39 42 | QUANTITY 43 52 | 80 FLOOR STOCK 53 56 |
|---|---|---|---|---|---|---|---|
| 11 | ORIFICE, AIR RESTRICTING - FLUIDIC<br>B7, E20, E30, G11, B33, D27, H2, H9 | EA | 94 | 268 40 | | 8 | 0 |
| 12 | PLUG 3/32<br>A20, B22, B26, B32, B34, C11,<br>C15, D22, D28, D33, E32, F33, G28,<br>G32, B31, D31, G31, H15 | EA | 24 | 3026 8 | | 18 | 0 |
| 14 | TUBING, PRE-CUT<br>B7 - G11 | EA | 94 | 416 90 | | 1 | 0 |
| 15 | TUBING, PRE-CUT<br>E20 - E30 | EA | 94 | 416 104 | | 1 | 0 |
| 17 | RESISTOR & END CAP SUBASSY<br>H2 - H9 | EA | 25 | 882 27 | | 1 | 0 |
| 18 | RESISTOR & END CAP SUBASSY<br>B33 - D27 | EA | 25 | 882 19 | | 1 | 0 |
| 21 | CHEMICAL, BROMOCHLORMETHANE | QT | 02 | 216 114 | | 0 | 0 |
| 24 | SPACER, P.C. BOARD | EA | 02 | 45 424 | | 1 | 0 |
| 3 | SUBASSY., T.P. ADPTR.<br>A14 | EA | 25 | 820 18 | | 1 | 0 |
| 26 | TEST POINT ADAPTER - A14 | EA | 24 | 3050 1 | | 1 | 0 |

Figure 18:
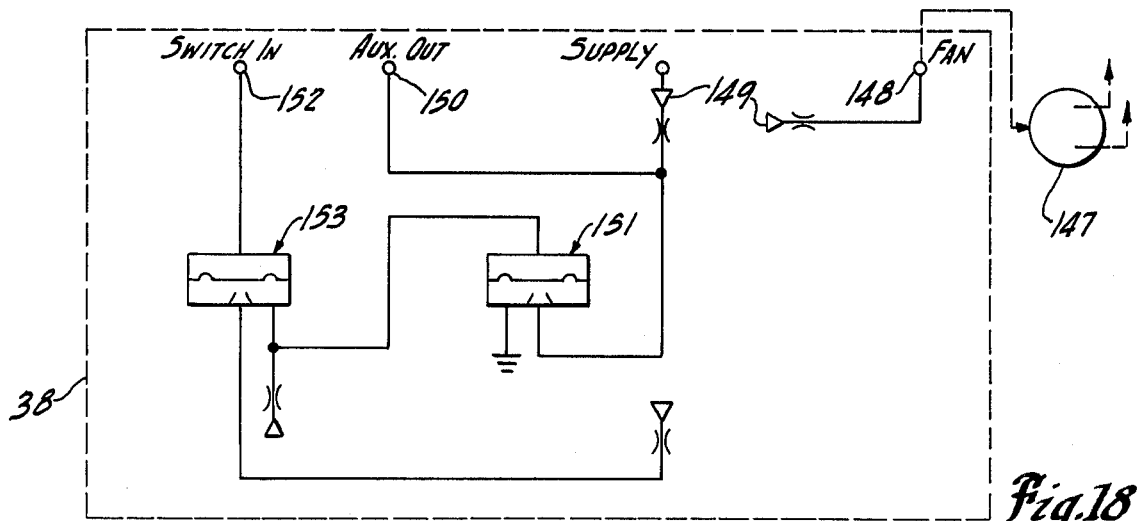

In FIG. 18, a typical circuit is schematically shown for the last module 38, which is adapted to establish certain auxiliary signals and a fan status signal. A fan sensing port 148 is connected to supply through a transmitter 149 and to the fan status booster 147 such as previously discussed with respect to FIG. 17. An auxiliary output port 150 is connected to the supply transmitter 149 and to reference by a repeater 151. In the illustrated circuit, a summer/winter signal port 152 is adapted to receive the corresponding signal from module 34. The port 152 is connected to actuate a repeater 153, the output of which is connected to control repeater 151 and thereby the output signal at port 150. An output status signal may be coupled to the appropriate gauge shown in the control 30. This circuit is again formed by the simple plug-in attachment of the appropriate components are connected to the board to the proper circuit board formed with a center plate 103 shown in FIG. 13 and defining the auxiliary family module. The logic and control components are connected to the board in accordance with the following specification:

Various other modules are similarly constructed from the five basic function module circuit boards, with appropriate connection of the appropriate logic devices and control devices. The particular system design and components will be readily provided by those skilled in the art of fluid circuit design, such as in the field of heating, ventilating and air conditioning field as well as industrial and other applications wherein pneumatic controls have been used. Thus, the grid pattern of each board with the interconnecting internal openings, as well as the outer surface ports, provide a readily understood circuit pattern which can be configured in anyone of a number of different specific circuits. In any original design, the designer will of course develop the appropriate pattern for a particular field of application dependent upon the number of inputs and the number of loads as well as the particular different control functions which must be provided for each load device and the like.

The function modules thus provide a particularly practical and cost effective means of developing sophis-

FUNCTION MODULE ASSEMBLY FM-5100-1

| ITEM | COMPONENT DESCRIPTION | U/M | COMPONENT NO. 27 38 | | DEPT. 39 42 | QUANTITY 43 52 | 80 FLOOR STOCK 53 56 |
|---|---|---|---|---|---|---|---|
| 1 | MODULE SUBASSY FOR FM-5000 SERIES | EA | 25 | 791 64 | | 1 | 0 |
| 1 | ORIFICE, AIR RESTRICTING - FLUIDIC<br>E30 | EA | 94 | 268 16 | | 1 | 0 |
| 5 | REPEATER SUBASSY<br>E7 (CTR) - B7, G33 (CTR) - G30 | EA | 25 | 727 3 | | 2 | 0 |
| 6 | MANIFOLD SUBASSY, TRANSMITTER<br>RM-1 | EA | 25 | 787 72 | | 1 | 0 |
| 7 | MANIFOLD SUBASSY, TRANSMITTER<br>RM-2 | EA | 25 | 787 99 | | 1 | 0 |
| 8 | HANDLE MODULE | EA | 24 | 3004 1 | | 1 | 0 |
| 9 | NAMEPLATE, FUNCTION MODULE | EA | 24 | 3103 412 | | 1 | 0 |
| 10 | PLUG 1/16<br>SPIGGOT 4 & 9 | EA | 24 | 3101 6 | | 2 | 0 |
| 12 | PLUG 3/32<br>B28, B31, B33, C11, C15, I28,<br>D31, D33, E11, E20, E11, F15,<br>F33, G28, G31 | EA | 24 | 3026 8 | | 15 | 0 |
| 21 | CHEMICAL, BROMOCHLOROMETHANE | QT | 02 | 216 114 | | 0 | 0 |
| 24 | SPACER, P.C. BOARD | EA | 02 | 45 424 | | 1 | 0 |

Various modes in carrying out the invention are contemplated as being within the scope of the following claims, particularly pointing out and distinctly claiming the subject matter which is regarded as the invention.

We claim:

1. A modular fluid control module for establishing the control of one functional load means of a plurality of interrelated controlled devices in response to fluid input signals and adapted to be connected to a main circuit board having a series of main board connectors, each including a fixed configuration of input ports and output ports and said main board connectors providing for different functional control, comprising a fluid circuit board having a plurality of internal passageways and including a plurality of function surface ports connected to said internal passageways, a plurality of functional fluid logic devices and functional fluid control devices connected to and supported by said plurality of function surface ports, said ports not connected to said devices being sealed or vented to a reference, and said circuit board having a multiple input/output port connector including input ports to receive sensed signals and operating pressure and output ports to transmit control signal and operating signals arranged in a fixed configuration corresponding to one of said fixed configurations of said main circuit board for releasable attachment to one of said connectors of said main board connector and thereby being constructed and arranged to receive selected input signals from said main circuit board and developing output signal to operate the corresponding controlled devices, said functional fluid logic devices and said functional fluid control devices being selected to operate conjointly to establish a particular control function sequence output at the output ports in response to the input signal at the input ports and whereby the control function sequence is different for different combinations of said function and devices.

2. The modular fluid control module of claim 1 wherein said fluid circuit board includes top and bottom plate members abutting and permanently affixed to a common center plate, said top plate having first connecting parallel flow lines and said bottom plate having second connecting parallel lines, only one of said top and bottom plate members including said multiple input/output port connector and having ports connected to the parallel flow lines of the corresponding plate member, said first and second parallel lines being substantially perpendicularly related to define an X-Y coordinate grid, said center plate having openings establishing preselected connection of said parallel lines in said top and bottom plates for establishing selected response to said input signals and establishing control signals to said port connector.

3. The modular fluid control apparatus of claim 2 wherein said top and bottom plate members each including connecting ports connected to said plurality of connecting passageways, said ports being connected as plug-in connector means.

4. The modular fluid control module of claim 3 wherein said top and bottom plates including ports connected to the end of substantially all of said parallel passageways.

5. A modular fluid control module for establishing the control of one functional load means of a plurality of interrelated controlled devices in response to fluid input signals and adapted to be connected to a main circuit board having a series of main board connectors, each including a fixed configuration of input ports and output ports and said main board connectors providing for different functional control, comprising a fluid circuit board having a plurality of internal passageways and including a plurality of function surface ports connected to said internal passageways, a plurality of functional fluid logic devices and functional fluid control devices connected to said devices being sealed or vented to a reference, and said circuit board having a multiple input/output port connector including input ports and output ports arranged in a fixed configuration corresponding to one of said fixed configurations of said main circuit board for releasable attachment to one of said connectors of said main board connector and thereby being constructed and arranged to receive selected input signals from said main circuit board and developing output signal to operate the corresponding controlled devices, said fluid circuit board includes top and bottom plate members abutting and permanently affixed to a common center plate, said top plate having first connecting parallel flow lines and said bottom plate having second connecting parallel lines, only one of said top and bottom plate members including said multiple input/output port connector and having ports connected to the parallel flow lines of the corresponding plate member, said first and second parallel lines being substantially perpendicularly related to define an X-Y coordinate grid, said center plate having openings establishing preselected connection of said parallel lines in said top and bottom plates for establishing selected response to said input signals and establishing control signals to said port connector, said control devices include fluid repeaters having a dead end input chamber having an input port and an output chamber having an input port and diaphragm controlled orifice port, said module including ports spaced in accordance with said fluid repeater ports.

6. A modular fluid control module for controlling air handling units of a heating, ventilating and air conditioning having temperature demand sensors and auxiliary sensors, and for establishing the control of one functional load means of a plurality of interrelated controlled devices in response to fluid input signals and adapted to be connected to a main circuit board having a series of main board connectors, each including a fixed configuration of input ports and output ports and said main board connectors providing for different functional control, comprising a fluid circuit board having a plurality of internal passageways and including a plurality of function surface ports connected to said internal passageways, a plurality of functional fluid logic devices and functional fluid control devices connected to said function surface ports, said ports not connected to said devices being sealed or vented to a reference, and said circuit board having a multiple input/output port connector including input ports and output ports arranged in a fixed configuration corresponding to one of said fixed configurations of said main circuit board for releasable attachment to one of said connectors of said main board connector and thereby being constructed and arranged to receive selected input signals from said main circuit board and developing output signals to operate the corresponding controlled devices, said fluid logic devices are plug-in units, said plug-in units include fluid repeaters connected to said surface ports connected to input ports for said sensors, each of said fluid repeater connected to a demand sensor port being connected to an output port of said connector and operable to modulate the level of the output signal at said output port, a fluid comparator device having an input port connected to an auxiliary sensor port and an output port connected to modify the output of said fluid repeater connected to a demand sensor port.

7. The modular fluid control module of claim 6 wherein said auxiliary sensors include an outdoor air sensing module, an auxiliary fluid repeater connected to said auxiliary sensor, said fluid comparator having an input connected to said auxiliary fluid repeater and to a reference level and generating a related logic output signal operable to turn said first fluid repeater on and off.

8. The modular fluid control apparatus of claim 7 including a set point regulator connected to said fluid comparator to establish the level of the reference level.

9. A modular fluid control module for controlling air handling equipment in response to zone demand signal means, outside air signal means and safety state sensor means, comprising circuit plate means having a first set of parallel flow lines in one plane and a second set of second parallel flow lines in a second parallel plane, said first and second sets being oriented substantially perpendicular to each other, said plate means having a plurality of openings connecting selected flow lines from said first and second flow lines, an input/output connector secured to one edge portion of the plate means and including a plurality of input ports and a plurality of output ports, said plate means having first ports located on the first side of the plate and connected to said first set of parallel lines and second ports located on the second side of the plate and connected to the second set of parallel flow lines, said ports being adapted to receive plug-in connections, an air supply transmitter having an input port and a plurality of outlet ports spaced in accordance with said first ports, a first fluid repeater having an input chamber with an input port and a control chamber having a connecting port and an orifice port, said first fluid repeater being connected to said input port connected to said zone demand signal means, a second fluid repeater corresponding to said first fluid repeater and connected to said outside air signal means, a set point regulator having an adjustable control and a regulated pressure output connected to said second repeater and operable to restrict the operation of said second fluid repeater until said signal pressure overcomes said regulated pressure output to establish a binary logic fluid output signal, and fluid comparator connected to said first and second fluid repeaters and operable to control the output of the first fluid repeater.

10. The module of claim 9 having an input port connected to said safety state sensor, a fluid diode connected to said ports for said first set of fluid lines between said input port and said output port.

11. A modular fluid control for establishing the control of one functional load means of a plurality of interrelated controlled devices in response to fluid input signals and adapted to be connected to a main circuit board having a series of main board connectors, each including a fixed configuration of input ports and output ports and said main board connectors providing for different functional control, comprising a fluid circuit board having a plurality of internal passageways and including a plurality of function surface ports connected to said internal passageways, a plurality of functional fluid logic devices and functional fluid control devices connected to said function surface ports, said ports not connected to said devices being sealed or vented to a reference, and said circuit board having a multiple input/output port connector including input ports and output ports arranged in a fixed configuration corresponding to one of said fixed configurations of said main circuit board for releasable attachment to one of said connectors of said main board connector and thereby being constructed and arranged to receive selected input signals from said main circuit board and developing output signal to operate the corresponding controlled devices, said control devices include fluid repeaters having a dead end input chamber having an input port and an output chamber having an input port and diaphragm controlled orifice port, said module including ports spaced in accordance with said fluid repeater ports.

* * * * *

UNITED STATES PATENT AND TRADEMARK OFFICE
CERTIFICATE OF CORRECTION

PATENT NO. : 4,458,841

DATED : July 10, 1984

INVENTOR(S) : RICHARD N. LAAKANIEMI ET AL

It is certified that error appears in the above-identified patent and that said Letters Patent is hereby corrected as shown below:

Col. 8, Line 22, cancel "levels" and substitute therefore ---level---; Col. 10, Line 45, cancel "platee" and substitute therefore ---plate---; Col. 11, Line 56, cancel "limitaion" and substitute therefore ---limitation---; Col. 13, Line 5, after "is" insert ---vented---; Col. 22, Line 9, after "said" insert ---function surface ports, said ports not connected to said---; Col. 12, line 12, "notces" should read -- notches--

Signed and Sealed this

Fourth Day of June 1985

[SEAL]

Attest:

DONALD J. QUIGG

Attesting Officer    Acting Commissioner of Patents and Trademarks